United States Patent
Stanciu et al.

(10) Patent No.: US 9,702,219 B2
(45) Date of Patent: Jul. 11, 2017

(54) POLYMERIZABLE IONIC LIQUIDS FOR USE IN SUBTERRANEAN FORMATION OPERATIONS

(71) Applicant: Halliburton Energy Services, Inc., Houston, TX (US)

(72) Inventors: Corneliu Stanciu, Kingwood, TX (US); James Ogle, Spring, TX (US); Bradley James Sparks, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/759,947

(22) PCT Filed: Oct. 1, 2014

(86) PCT No.: PCT/US2014/058557
§ 371 (c)(1),
(2) Date: Jul. 9, 2015

(87) PCT Pub. No.: WO2016/053327
PCT Pub. Date: Apr. 7, 2016

(65) Prior Publication Data
US 2016/0265307 A1    Sep. 15, 2016

(51) Int. Cl.
| | | |
|---|---|---|
| *E21B 43/267* | (2006.01) | |
| *E21B 33/138* | (2006.01) | |
| *C09K 8/575* | (2006.01) | |
| *E21B 43/26* | (2006.01) | |
| *C09K 8/56* | (2006.01) | |

(Continued)

(52) U.S. Cl.
CPC ............. *E21B 33/138* (2013.01); *C09K 8/56* (2013.01); *C09K 8/575* (2013.01); *C09K 8/805* (2013.01); *E21B 43/26* (2013.01); *E21B 43/267* (2013.01); *C09K 8/5753* (2013.01); *C09K 8/62* (2013.01); *E21B 43/04* (2013.01)

(58) Field of Classification Search
CPC ............................ E21B 43/267; C09K 8/805
See application file for complete search history.

(56) References Cited

U.S. PATENT DOCUMENTS

| | | |
|---|---|---|
| 6,311,773 B1 | 11/2001 | Todd et al. |
| 8,552,130 B2 | 10/2013 | Lewandowski et al. |

(Continued)

FOREIGN PATENT DOCUMENTS

| | | |
|---|---|---|
| DE | 102006060061 A1 | 6/2008 |
| WO | 2011087621 A2 | 7/2011 |
| WO | 2016/053327 A1 | 4/2016 |

OTHER PUBLICATIONS

Yuan et al., Poly(ionic liquid)s: Polymers expanding classical property profiles, Polymer 52 (2011), 1469-82.

(Continued)

*Primary Examiner* — Catherine Loikith
(74) *Attorney, Agent, or Firm* — McDermott Will & Emery LLP

(57) ABSTRACT

A stabilization composition including a polymerizable ionic liquid ("PIL") comprising a cationic group, an anionic group, and a polymerizable functional group, wherein the cationic group has a molecular mass in the range of about 20 g/mol to about 500 g/mol and the anionic group has a molecular mass in the range of about 30 g/mol to about 500 g/mol.

19 Claims, 1 Drawing Sheet

(51) Int. Cl.
*C09K 8/80* (2006.01)
*E21B 43/04* (2006.01)
*C09K 8/62* (2006.01)

(56) References Cited

U.S. PATENT DOCUMENTS

| | | |
|---|---|---|
| 8,742,047 B2 | 6/2014 | Lewandowski et al. |
| 2009/0029880 A1 | 1/2009 | Berry et al. |
| 2009/0242414 A1 | 10/2009 | Welz-Biermann et al. |
| 2011/0224324 A1 | 9/2011 | Loccufier et al. |
| 2012/0149800 A1 | 6/2012 | Lewandowski et al. |
| 2014/0045732 A1 | 2/2014 | Mazyar et al. |
| 2014/0374267 A1* | 12/2014 | Monteiro ............... C25D 15/00 205/104 |
| 2015/0240144 A1* | 8/2015 | Kumar ................... C09K 8/68 508/211 |

OTHER PUBLICATIONS

International Search Report and Written Opinion for PCT/US2014/058557 dated May 29, 2015.

* cited by examiner

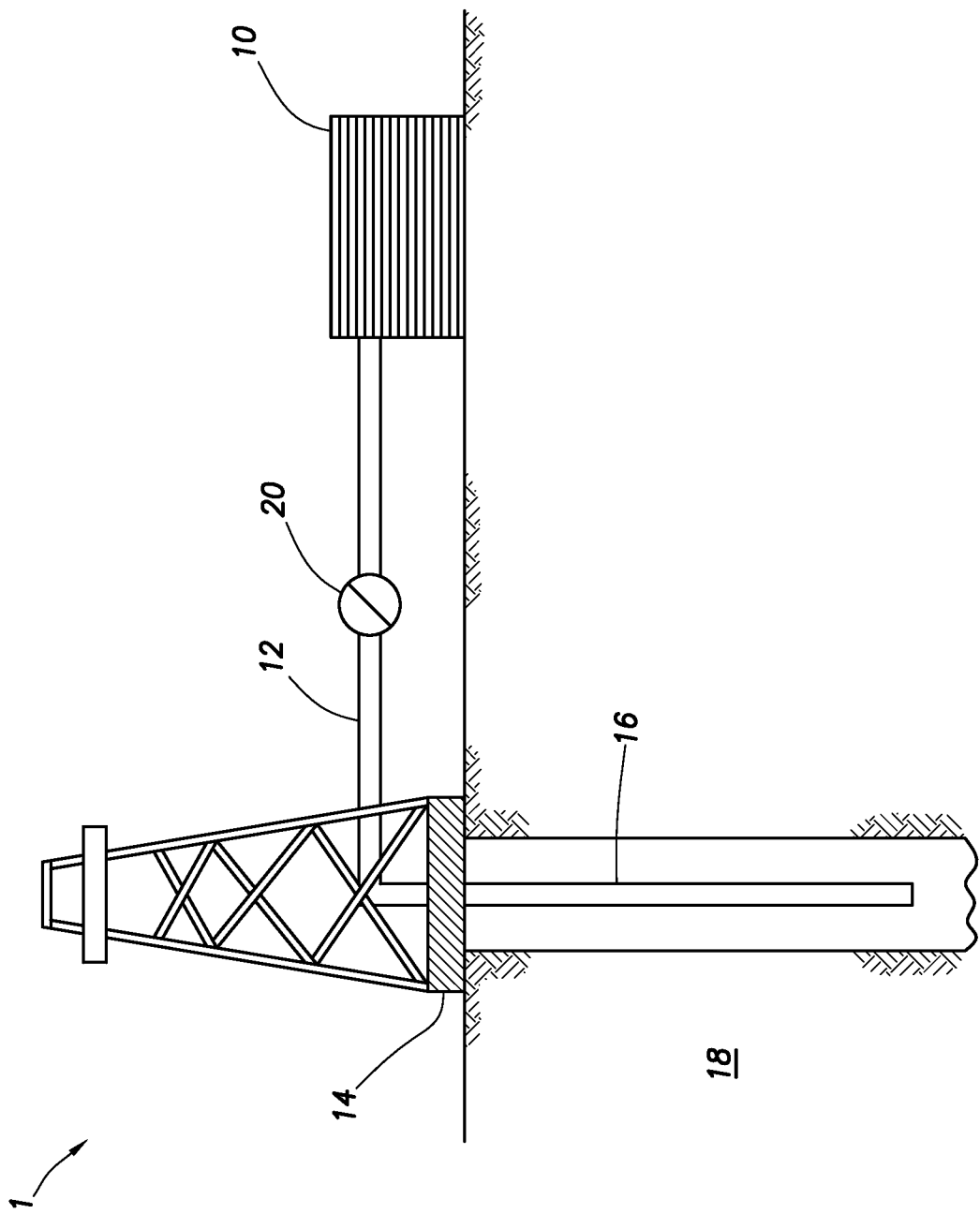

POLYMERIZABLE IONIC LIQUIDS FOR USE IN SUBTERRANEAN FORMATION OPERATIONS

BACKGROUND

The present disclosure is related to subterranean formation operations and, more particularly, to subterranean formation operations including polymerizable ionic liquids.

Hydrocarbon-producing wells (e.g., vertical, deviated, and horizontal wells in a subterranean formation) are generally drilled using a drilling fluid pumped down a drill string and through a drill bit attached to the end of the drill string. The drilling fluid serves, among other things, to lubricate and cool the cutting surfaces of the drill bit, transport drill cuttings to the surface, control formation pressure, and maintain well stability. After drilling is complete, a casing string may be placed in the wellbore through which hydrocarbons will eventually flow. An annulus is formed between the casing string and the face of the wellbore, which may be partially or fully filled with cement in order to hold the casing string in place. In some applications, cementing of the annulus is not necessary and the casing string may be entirely uncemented, if included at all.

Stimulation of hydrocarbon-producing wells may be achieved using hydraulic fracturing treatments. In hydraulic fracturing treatments, a viscous treatment fluid may be pumped into a portion of a subterranean formation at a rate and pressure such that the subterranean formation breaks down and one or more fractures are formed. Typically, particulate solids, such as graded sand, are introduced into the subterranean formation in a portion of the treatment fluid and deposited into the fracture. These particulate solids (generally known as "proppant particulates" or, simply, "proppant") serve to prop the fracture open (e.g., keep the fracture from fully closing) after the hydraulic pressure is removed. By keeping the fracture from fully closing, the proppants aid in forming conductive paths through which fluids, such as hydrocarbons, may flow.

The process of drilling and fracturing a subterranean formation often creates unconsolidated particulates both from the natural abrasion of the formation itself and from any proppant not confined to the fracture (i.e., naturally occurring, placed during an operation, or created during an operation). These unconsolidated particulates may undesirably migrate within the formation. As used herein, the term "unconsolidated particulates" refers to any loose or loosely bonded particulates that may move through the formation with wellbore fluids (e.g., production fluids). Unconsolidated particulates may include, for example, sand, gravel, other particulates, and/or formation fines.

The unconsolidated particulates may migrate out of the subterranean formation and be produced with production fluids. The presence of unconsolidated particulates in a formation during production is undesirable at least because they may damage or abrade producing equipment or reduce well production. For example, unconsolidated particulates may migrate into wellbore casings, perforations, or the interstitial spaces between packed proppants within a fracture and clog or hinder well production.

One method of controlling unconsolidated particulates in subterranean formations is to perform a gravel-packing treatment. In gravel-packing treatments, particulates are deposited into unconsolidated or weakly consolidated formation zones to create a physical barrier to the transport of unconsolidated particulates with produced fluids. Typical gravel-packing treatments include placing a screen in a wellbore and packing the annulus between the screen and the wellbore with particulates of a certain size to prevent the transport of unconsolidated particulates with the produced fluids without compromising the conductivity of the well. Gravel-packing treatments, however, involve placement of additional unconsolidated particulates into the wellbore which may not be adequately maintained, for example, by a screen and which may, therefore, migrate along with the produced fluids.

Another method of controlling unconsolidated particulates is to treat the wellbore with a consolidating agent. In such treatments, a consolidating agent is placed into the wellbore in order to stabilize unconsolidated particulates, such as by contacting unconsolidated particulates and curing into a hardened mass. Typically, the consolidating agent may be used to lock unconsolidated particulates in place and form at least a partially immobilized substance, which may be accomplished by enhancing grain-to-grain or grain-to-formation contact of the unconsolidated particulates.

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

The FIGURE depicts an embodiment of a system configured for delivering the stabilization compositions of the embodiments described herein to a downhole location.

DETAILED DESCRIPTION

The present disclosure is related to subterranean formation operations and, more particularly, to subterranean formation operations including polymerizable ionic liquids. Specifically, the embodiments herein provide a stabilization composition comprising a polymerizable ionic liquid ("PIL"). As used herein, the term "ionic liquid" refers to a salt with a melting point below 100° C. (212° F.). In some embodiments, the ionic liquid may have a melting point below about 24° C. (75° F.), or room temperature. As used herein, the term "polymerizable ionic liquid" refers to an ionic liquid having a polymerizable functional group. A polymerized PIL may act as a consolidating agent, which in downhole environments may mitigate the migration of unconsolidated particulates, as described above. As used herein, the terms "consolidation" and "stabilization," and any grammatical variants thereof, may be used interchangeably and refer to forming a substantially (i.e., largely but not necessarily wholly) agglomerated material.

Although some embodiments described herein are illustrated by reference to hydraulic stimulation treatments, the stabilization compositions disclosed herein may be used in any subterranean formation operation that may benefit from consolidation of particulates. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; a remedial operation; a near-wellbore consolidation operation; a plug and abandonment operation; and any combination thereof. By way of example, many consolidating treatments are performed at matrix flow rates. As used herein, the term "matrix flow rates" refers to a fluid rate such that the pressure exerted on the formation is less than that formation's fracturing pressure.

Moreover, the stabilization compositions described herein may be used in any non-subterranean operation that may benefit from their consolidation. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The present disclosure provides a stabilization composition comprising at least one PIL. The PIL described herein are ionic liquids with a polymerizable functional group. As ionic liquids are salts, the PIL can be described as compound comprising a cationic group, an anionic group, and a polymerizable group, wherein the compound has a melting point below 100° C. (212° F.), and preferably below about 24° C. (75° F.), or room temperature.

In some embodiments, the stabilization composition may be introduced into a wellbore in a subterranean formation and coated onto a face of a formation, such as a fracture face. As used herein, the term "formation face," and grammatical variants thereof (e.g., "face of a formation," "face of a subterranean formation," and the like) refers to any portion of the formation that is exposed to a material introduced into the formation (e.g., a fluid, a particulate, and the like). As used herein, the term "coat" refers to the ability of the PIL to permeate (i.e., spread) around, into, or onto a surface and concentrate therearound, thereon, or therein due to electrostatic interaction between the charged species (i.e., the cationic or anionic group) of the PIL and the surface, and the term does not imply any particular degree of coverage. The surface coated may be a formation face (e.g., individual particulates making up the formation or interstitial spaces between individual particulates, such as pore throats, unconsolidated particulates forming part of a formation, and the like) or particulates introduced into a formation (e.g., proppant particulates, gravel particulates, and the like, including interstitial spaces between packed particulates, such as in a proppant pack).

Once in the formation and coated on the formation face, the PIL of the stabilization composition may be polymerized. The polymerized PIL coated on the formation faces may reduce the migration of unconsolidated particulates by adhering the unconsolidated particles thereto.

In some embodiments, the stabilization composition may be coated onto proppant particulates, thereby forming coated particulates. The coated proppant particulates (optionally with additional stabilization composition in a base fluid) may be introduced into a subterranean formation (e.g., to form a proppant pack in at least one fracture of the formation or a gravel pack in the wellbore). Thereafter, the PIL in the stabilization composition may be polymerized, thereby forming a stabilized proppant pack or gravel pack. In some embodiments, the polymerized PIL mitigates dislodging of the individual proppant particulates that could then become unconsolidated particles. Additionally, in some instances, the stabilized proppant pack or gravel pack may also prevent other unconsolidated particulates in the fracture from flowing past the proppant pack or gravel pack and into the wellbore similar to as described above.

The cationic group of a PIL described herein may be any cationic group compatible with the remaining elements of the PIL (i.e., the anionic group and the polymerizable functional group). In some embodiments, the cationic group is an organic cationic group. The cationic group may have a molecular mass in the range of a lower limit of about 20 grams/mole ("g/mol"), 40 g/mol, 60 g/mol, 80 g/mol, 100 g/mol, 120 g/mol, 140 g/mol, 160 g/mol, 180 g/mol, 200 g/mol, 220 g/mol, 240 g/mol, and 260 g/mol to an upper limit of about 500 g/mol, 480 g/mol, 460 g/mol, 440 g/mol, 420 g/mol, 400 g/mol, 380 g/mol, 360 g/mol, 340 g/mol, 320 g/mol, 300 g/mol, and 280 g/mol. Suitable specific examples of cationic groups of the PIL described herein may include, but are not limited to, ammonium (e.g., tetraalkylammonium), phosphonium (e.g., tetraalkylphosphonium), pyridinium (e.g., 1-alkylpyridinium), imidazolium (e.g., 1-alkyl-3-methylinnidazolium, 1-2-dialkyl-imidazolium, 1-decyl-3-methyl-imidazolium), a pyrrolidinium (e.g., N-methyl-N-alkylpyrrolidinium), a cholinium, a pyrazolium, and any combination thereof.

The anionic group of a PIL described herein may be any anionic group compatible with the remaining elements of the PIL (i.e., the cationic group and the polymerizable functional group). The anionic group may, in some instances, be an organic anionic group, an inorganic anionic group, and any combination thereof. In some embodiments, the anionic group of the PIL may have a molecular mass in the range of a lower limit of about 30 g/mol, 40 g/mol, 60 g/mol, 80 g/mol, 100 g/mol, 120 g/mol, 140 g/mol, 160 g/mol, 180 g/mol, 200 g/mol, 220 g/mol, 240 g/mol, and 260 g/mol to an upper limit of about 500 g/mol, 480 g/mol, 460 g/mol, 440 g/mol, 420 g/mol, 400 g/mol, 380 g/mol, 360 g/mol, 340 g/mol, 320 g/mol, 300 g/mol, and 280 g/mol. Specific examples of suitable anionic groups of the PIL described herein may include, but are not limited to, a halide (e.g., chloride, fluoride, bromide, iodide), a formate, an alkylsulfate, an alkylphosphate, a glycolate, a nitrate, a tetrafluoroborate, a hexafluorophosphate, a bistriflimide, a triflate, a tosylate, a carboxylate, a sulfate, a sulfonate, a perchlorate, a hexafluoridoantimonate, a hexafluoroarsinate, and any combination thereof.

Generally, the cationic group and the anionic group provide for a charge balanced salt.

The PIL may have one or more polymerizable functional groups on the anionic group and/or the cationic group. In other embodiments, the polymerizable functional group may be preferably on the cationic group of the PIL. For example, in some embodiments, the PIL may have the following general formula:

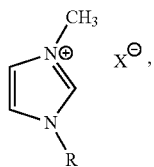

where X is an anion and R is a polymerizable functional group located on the cationic group in the PIL. X may be any anion, including the anionic groups provided above. R may be any polymerizable chemical moiety.

In some embodiments, the polymerizable functional group of a PIL described herein may be a monofunctional group, a multifunctional group, and any combination thereof. That is, the PIL may include one or more polymerizable functional groups that may be solely monofunctional, solely multifunctional, or a combination of monofunctional and multifunctional. As used herein, the term "monofunctional group" refers to a chemical moiety having a single reactive site or chemical bond (e.g., reactive by free-radical polymerization, or other mechanisms). The term "multifunctional group," as used herein, refers to a chemical moiety having at least two reactive sites or chemical bonds (e.g., reactive by free-radical polymerization, or other mechanisms). In some embodiments, the polymerizable group may be a polymerizable group having a double or triple bond. In some embodiments, a multifunctional polymerizable functional group may be used to alter the polymerized architecture of the PIL to have a branched, hyperbranched, or crosslinked structure, for example. Such architectures may improve the physical properties of the polymerized PIL, such as by increasing the elasticity modulus and/or temperature stability, which may improve the consolidation properties of the stabilization composition.

Examples of specific polymerizable groups that may be included in forming the PIL of the present disclosure may include, but are not limited to, a vinyl group (e.g., vinyl ether, vinyl acetate, vinyl ester), a vinyl aryl group, a styryl group, an imino group, an acrylate group, a methacrylate group, an acrylamide group, a methacrylamide group, a styrene group, an acryl amide group, a methacryl amide group, a maleate group, a fumarate group, an iconate group, an allyl group (e.g., allyl ester, allyl ether), an allyl amino group, a methallyl group, a crotyl group, a propargyl group, a lipoyl group, a dihydrolipoyl group, and any combination thereof.

Examples of the PIL described herein may include, but is not limited to, 1-allyl-3-methylimidazolium chloride, 1-allyl-3-methylimidazolium bis(trifluoromethylsulfonyl)amide, diallyldimethylammonium-bis(trifluoromethanesulfonyl)imide, and any combination thereof.

In some embodiments, the stabilization composition comprising at least one PIL may further include a polymerization initiator for use in polymerizing the PIL, such as by free-radical addition polymerization. In other embodiments, the stabilization composition may be included in a base fluid either alone, as a coating onto a proppant particulate, or a combination thereof. In such embodiments, the base fluid may comprise a polymerization initiator. The polymerization initiators may produce radical species to promote radical addition polymerization of the PIL for stabilization of unconsolidated particulates in a subterranean formation, for example.

In some embodiments, the polymerization initiator may be encapsulated in an encapsulating material, such as to delay polymerization of the PIL. In some embodiments, the polymerization initiator may be encapsulated, for example, with a porous encapsulating material through which the polymerization initiator may diffuse slowly, or a degradable encapsulating material that degrades downhole. Suitable encapsulating materials may include, but are not limited to, polyvinyl alcohol, polylactic acid, ethylene propylene diene monomer rubber, polyvinylidene chloride, polyacrylamide, nylon, waxes, polyurethanes, cross-linked partially hydrolyzed acrylics, shellac, calcium sulfate, calcium chloride, cementitious materials, and any combination thereof.

Examples of polymerization initiators may include, but are not limited to, a thermal initiator, a photoinitiator, and any combination thereof. The thermal initiator may aid in polymerization of the PIL at certain temperatures, depending on the type of thermal initiator used, such as temperatures in excess of about 20° C. (about 68° F.). Accordingly, in some embodiments, the temperature in a wellbore may serve to cause the thermal initiator to produce radical species, where it is otherwise stable at room temperature (e.g., storage temperatures). The photoinitiator may produce radical species upon exposure to light ("hv"). Such exposure may be in the form of natural light (e.g., at a well site prior to introducing the stabilization composition into a wellbore) or may be produced at a downhole location by light source (e.g., a light source on a downhole tool or embedded in casing). The light source may be visible light, infrared light, ultraviolet light, and any combination thereof.

The thermal initiator may be any chemical species capable of producing radical species upon exposure to certain temperatures, typically above room temperature, that can aid in polymerizing the PILs of the present disclosure. Specific examples of suitable thermal initiators for inclusion in the stabilization compositions herein may include, but are not limited to, an azo initiator (e.g., azoisobutyronitrile, 4,4'-azobis(4-cyanovaleric acid), 1,1'-azobis(cyclohexanecarbonitrile), 2,2'-azobis(2-methylpropionamidine) dihydrochloride, 2,2'-azobis(2-methylpropionitrile), 2,2'-azobis(2-methylpropionitrile), an inorganic peroxide initiator (e.g. ammonium persulfate, hydroxymethanesulfinic acid, potassium persulfate, sodium persulfate), an organic peroxide initiator (e.g., tert-butyl hydroperoxide, tert-butyl peroxide, benzoyl peroxide), and any combination thereof.

Suitable photoinitiators that may be used in the stabilization compositions described herein may include any chemical species capable of producing radical species upon exposure to a light source to aid in polymerizing the PILs of the present disclosure. Suitable photoinitiators may include, but are not limited to, an acetophenone photoinitiator, a benzoin photoinitiator, a benzyl photoinitiator, a benzophenone photoinitiator, a cationic photoinitiator, a thioxanthone photoinitiator, an anthraquinone-2-sulfonic acid sodium salt, a 2-tert-butylanthraquinone, a camphorquinone, a diphenyl(2,4,6-trimethylbenzoyl)phosphine oxide, a 9,10-phenanthrenequinone, a phenylbis(2,4,6-trimethylbenzoyl)phosphine oxide, and any combination thereof.

Suitable acetophenone photoinitiators may include, but are not limited to, 2,2-dimethoxy-2-phenylacetophenone, 4'-ethoxyacetophenone, 3'-hydroxyacetophenone, 4'-hydroxyacetophenone, 2,2-diethoxyacetophenone, 4'-tert-butyl-2',6'-dimethylacetophenone, 4'-phenoxyacetophenone, 2-benzyl-2-dimethylamino-4'-morpholinobutyrophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholino-propiophenone, and any combination thereof. Suitable benzoin photoinitiators may include, but are not limited to, benzoin ethyl ether, benzoin methyl ether, 4,4'-dimethoxy-benzoin, and any combination thereof. Suitable benzyl photoinitiators may include, but are not limited to, 4,4'-dimethylbenzil. Suitable benzophenone photoinitiators may include, but are not limited to, 4,4'-Bis(diethylamino)benzophenone, 4,4'-bis[2-(1-propenyl)phenoxy]benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, 4-benzoylbiphenyl), and any combination thereof.

Suitable cationic photoinitiators may include, but are not limited to, e.g., Bis(4-tert-butylphenyl)iodonium perfluoro-1-butanesulfonate, Bis(4-tert-butylphenyl)iodonium p-toluenesulfonate, bis(4-tert-butylphenyl)iodonium triflate, boc-methoxyphenyldiphenylsulfonium triflate, (4-Bromophenyl)diphenylsulfonium triflate, (tert-Butoxycarbonylmethoxynaphthyl)-diphenylsulfonium triflate, (4-tert-Butylphenyl)diphenylsulfonium triflate, Diphenyliodonium hexafluorophosphate, Diphenyliodonium nitrate, Diphenyliodonium perfluoro-1-butanesulfonate, Diphenyliodonium p-toluenesulfonate, Diphenyliodonium triflate, (4-Fluorophenyl)diphenylsulfonium triflate, N-Hydroxynaphthalimide triflate, N-Hydroxy-5-norbornene-2,3-dicarboximide perfluoro-1-butanesulfonate, (4-Iodophenyl) diphenylsulfonium triflate, (4-Methoxyphenyl) diphenylsulfonium triflate, 2-(4-Methoxystyryl)-4,6-bis(trichloromethyl)-1,3,5-triazine, (4-Methylphenyl) diphenylsulfonium triflate, (4-Methylthiophenyl)methyl phenyl sulfonium triflate, 1-Naphthyl diphenylsulfonium triflate, (4-Phenoxyphenyl)diphenylsulfonium triflate, (4-Phenylthiophenyl)diphenylsulfonium triflate, Triphenylsulfonium perfluoro-1-butanesufonate, Triphenylsulfonium triflate, Tris(4-tert-butylphenyl)sulfonium perfluoro-1-butanesulfonate, Tris(4-tert-butylphenyl)sulfonium triflate, and any combination thereof. Suitable thioxanthone photoinitiators may include, but are not limited to, 1-Chloro-4-propoxy-9H-thioxanthen-9-one, 2-Chlorothioxanthen-9-one, 2,4-Diethyl-9H-thioxanthen-9-one, Isopropyl-9H-thioxanthen-9-one, 10-Methylphenothiazine, Thioxanthen-9-one, and any combination thereof.

In some embodiments, the polymerization initiator may be present in the stabilization compositions of the present disclosure in an amount in the range of a lower limit of about 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the PIL in the stabilization composition, encompassing any value and subset therebetween. In other embodiments, the polymerization initiator may be present in the stabilization compositions of the present disclosure in an amount in the range of a lower limit of about 0.5% to an upper limit of about 2%, encompassing any value and subset therebetween.

In some embodiments, the PIL may be a 1-allyl-3-methylimidazolium chloride. Reaction 1 and 2 below are non-limiting examples of schemes that can be used to form the 1-allyl-3-methylimidazolium chloride, in the presence of a thermal initiator, azoisobutyronitrile ("AIBN") or a photoinitiator, 2,2-dimethoxy-2-phenylacetophenone ("DMPA").

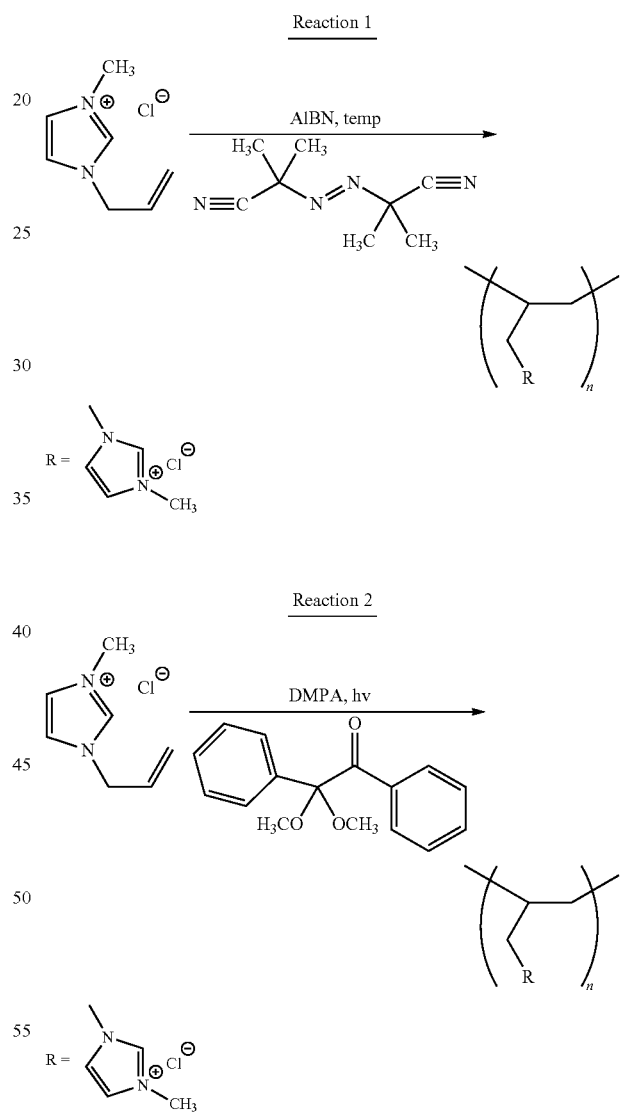

In other embodiments, the PIL may be a 1-allyl-3-methylimidazolium bis(trifluoromethylsulfonyl)amide. Reaction 3 and 4 below are non-limiting examples of schemes that can be used to form the 1-allyl-3-methylimidazolium bis(trifluoromethylsulfonyl)amide, in the presence of a thermal initiator, azoisobutyronitrile ("AIBN") or a photoinitiator, 2,2-dimethoxy-2-phenylacetophenone ("DMPA").

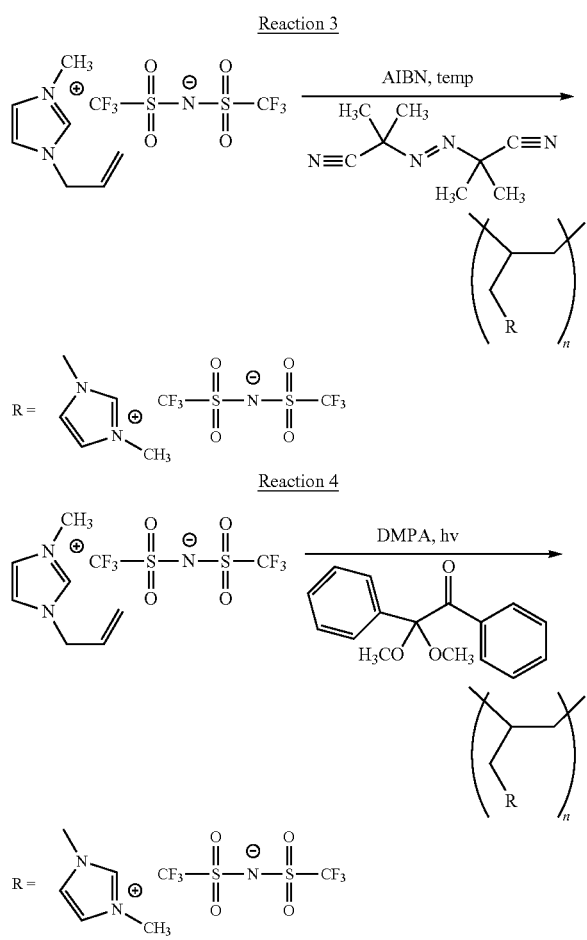

In some embodiments, the stabilization composition and/or particulates coated with the stabilization composition may be included in a base fluid. The base fluid may be used as a carrier for delivering the stabilization composition to a downhole location or for delivering the proppant particulates coated with the stabilization composition to a downhole location. In some embodiments, the base fluid comprising the stabilization composition or the coated proppant particulates may be introduced into a subterranean formation at a rate and pressure sufficient to create or enhance at least one fracture therein, such as the at least one fracture in which the coated proppant particulates are placed. Suitable base fluids for use in conjunction with embodiments of the present disclosure may include, but are not limited to, oil-based fluids, aqueous-based fluids, aqueous-miscible fluids, water-in-oil emulsions, or oil-in-water emulsions. Selection of the appropriate type of base fluid may depend on a number of factors including, but not limited to, the type of PIL, the type of polymerization initiator or additives if included, the type of subterranean formation operation, whether solubilization of the PIL is desired, and the like.

Suitable oil-based fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-based fluids may include, but are not limited to, fresh water, saltwater (e.g., water containing one or more salts dissolved therein), brine (e.g., saturated salt water), seawater, and any combination thereof. Suitable aqueous-miscible fluids may include, but are not limited to, alcohols (e.g., methanol, ethanol, n-propanol, isopropanol, n-butanol, sec-butanol, isobutanol, and t-butanol), tetrahydrofuran, glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

In some embodiments, the base fluid may be included in the stabilization composition in the amount in the range of a lower limit of about 1%, 1.1%, 1.15%, 1.2%, 1.25%, 1.3%, 1.35%, 1.4%, 1.45%, and 1.5% to an upper limit of about 2%, 1.95%, 1.9%, 1.85%, 1.8%, 1.75%, 1.7%, 1.65%, 1.6%, 1.55%, and 1.5% by weight of the stabilization composition, including all components thereof, encompassing any value and subset therebetween.

In some embodiments, the base fluid comprising the stabilization composition and/or the coated proppant particulates may further comprise an additive for use in performing a particular subterranean formation operation. Suitable additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

The proppant particulates for use in forming the coated proppant particulates (i.e., coated with the stabilization composition described herein) may be any particulate suitable for use in a subterranean formation operation (e.g., particulates for forming a proppant pack in a fracture or for forming a gravel pack in the formation). Suitable materials for these proppant particulates may include, but are not limited to, sand, bauxite, gravel, ceramic material, glass material, polymeric material (e.g., ethylene-vinyl acetate or composite materials), polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and any combination thereof. In certain embodiments, the coated proppant particulates may be present in a base fluid described herein in an amount in the range of from a lower limit of about 0.5 pounds per gallon ("ppg"), 1 ppg, 2.5 ppg, 5 ppg, 7.5 ppg, 10 ppg, 12.5 ppg, and 15 ppg to an upper limit of about 30 ppg, 27.5 ppg, 25 ppg, 22.5 ppg, 20 ppg, 17.5 ppg, and 15 ppg by volume of the base fluid.

In some embodiments, degradable particulates may comprise a portion of the proppant particulates such that they intermix with proppant particulates and form a portion of the proppant pack. Upon a triggering event, the degradable particulates may be degraded, leaving behind spaces in the proppant pack that may enhance the conductivity of a propped fracture. It may be desirable that the degradable particulates have similar particle size, shape, and specific gravity as those of the proppant particulates. Suitable degradable particulates may include, but are not limited to, oil-degradable polymers, degradable polymers, degradable salts, blends thereof, and any combination thereof. In some embodiments, degradable particulates may be included in the range of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the proppant particulates as a whole. In some embodiments, degradable particulates may be included from about 5% to about 15% by weight of the proppant particulates as a whole. One of ordinary skill in the art, with the benefit of this disclosure, will recognize whether to include degradable particulates and in what concentration to achieve the desired results.

The proppant particulates (including the degradable particulates if included) may be of any size and shape combination known in the art as suitable for use in a fracturing operation. Generally, where the chosen proppant particulate is substantially spherical, they may have a size in the range of from a lower limit of about 2 mesh, 10 mesh, 20 mesh, 30 mesh, 40 mesh, 50 mesh, 60 mesh, 70 mesh, 80 mesh, 90 mesh, 100 mesh, 110 mesh, 120 mesh, 130 mesh, 140 mesh, 150 mesh, 160 mesh, 170 mesh, 180 mesh, 190 mesh, and 200 mesh to an upper limit of about 400 mesh, 390 mesh, 380 mesh, 370 mesh, 360 mesh, 350 mesh, 340 mesh, 330 mesh, 320 mesh, 310 mesh, 300 mesh, 290 mesh, 280 mesh, 270 mesh, 260 mesh, 250 mesh, 240 mesh, 230 mesh, 220 mesh, 210 mesh, and 200 mesh, U.S. Sieve Series, or even higher. In some embodiments of the present disclosure, the proppant particulates may have a size in the range of from about 8 to about 120 mesh, U.S. Sieve Series. There is no need for the proppant particulates to be sieved or screened to a particular or specific particle mesh size or particular particle size distribution, but rather a wide or broad particle size distribution can be used.

In some embodiments of the present disclosure, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches ("in"), 0.03 in, 0.04 in, 0.05 in, 0.06 in, 0.07 in, 0.08 in, 0.09 in, 0.1 in, 0.11 in, 0.12 in, 0.13 in, 0.14 in, and 0.15 in to an upper limit of about 0.3 in, 0.29 in, 0.28 in, 0.27 in, 0.26 in, 0.25 in, 0.24 in, 0.23 in, 0.22 in, 0.21 in, 0.2 in, 0.19 in, 0.18 in, 1.17 in, 0.16 in, and 0.15 in length. In other embodiments, the longest axis is from about 0.05 inches to about 0.2 inches in length. In one embodiment, the substantially non-spherical proppant particulates may be cylindrical and have an aspect ratio of about 1.5 to about 1, and about 0.08 inches in diameter and about 0.12 inches in length. In another embodiment, the substantially non-spherical proppant particulates may be cubic having sides of about 0.08 inches in length. The use of substantially non-spherical proppant particulates may be desirable in some embodiments described herein because, among other things, they may provide a lower rate of settling when slurried into a base fluid, or may be better suited for placement in the preexisting or new fractures described in some embodiments herein.

In various embodiments, systems configured for delivering the stabilization compositions (used herein to include the stabilization composition alone or coated onto proppant particulates, and also encompasses any use of a base fluid and/or additives in the base fluid) described herein to a downhole location are described. In various embodiments, the systems can comprise a pump fluidly coupled to a tubular, the tubular containing the stabilization compositions described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the stabilization composition to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the stabilization composition to the high pressure pump. In such embodiments, the low pressure pump may "step up" the pressure of the stabilization composition before it reaches the high pressure pump.

In some embodiments, the systems described herein can further comprise a mixing tank that is upstream of the pump and in which the stabilization composition is formulated. In various embodiments, the pump (e.g., a low pressure pump, a high pressure pump, or a combination thereof) may convey the stabilization composition from the mixing tank or other source of the stabilization composition to the tubular. In other embodiments, however, the stabilization composition can be formulated offsite and transported to a worksite, in which case the stabilization composition may be introduced to the tubular via the pump directly from its shipping container (e.g., a truck, a railcar, a barge, or the like) or from a transport pipeline. In either case, the stabilization composition may be drawn into the pump, elevated to an appropriate pressure, and then introduced into the tubular for delivery downhole.

The FIGURE shows an illustrative schematic of a system that can deliver stabilization compositions of the present invention to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which a stabilization composition of the present invention may be formulated. The stabilization composition may be conveyed via line 12 to wellhead 14, where the stabilization composition enters tubular 16, tubular 16 extending from wellhead 14 into subterranean formation 18. Upon being ejected from tubular 16, the stabilization composition may subsequently penetrate into subterranean formation 18. In some instances, tubular 16 may have a plurality of orifices (not shown) through which the stabilization composition of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the stabilization composition to a desired degree before its introduction into tubular 16. It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the stabilization composition may, in some embodiments, flow back to wellhead 14 and exit subterranean formation 18. In some embodiments, the stabilization composition that has flowed back to wellhead 14 may subsequently be recovered and recirculated to subterranean formation 18.

It is also to be recognized that the disclosed stabilization compositions may also directly or indirectly affect the various downhole equipment and tools that may come into contact with the stabilization compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

Embodiment A: A method comprising: introducing a stabilization composition into a wellbore in a portion of a subterranean formation, wherein the stabilization composition comprises a polymerizable ionic liquid ("PIL") comprising a cationic group, an anionic group, and a polymerizable functional group, and coating a face of the portion of the subterranean formation with the stabilization composition; and polymerizing the PIL in the wellbore.

Embodiment A may have one or more of the following additional elements in any combination:

Element A1: Wherein the stabilization composition is included in a base fluid.

Element A2: Wherein the face of the subterranean formation is a fracture face.

Element A3: Wherein the cationic group is an organic cationic group.

Element A4: Wherein the cationic group has a molecular mass in the range of about 20 g/mol to about 500 g/mol.

Element A5: Wherein the cationic group is selected from the group consisting of ammonium, phosphonium, pyridinium, imidazolium, a pyrrolidinium, a cholinium, a pyrazolium, and any combination thereof.

Element A6: Wherein the anionic group is selected from the group consisting of an organic anionic group, an inorganic cationic group, and any combination thereof.

Element A7: Wherein the anionic group has a molecular mass in the range of about 30 g/mol to about 500 g/mol.

Element A8: Wherein the anionic group is selected from the group consisting of a halide, a formate, an alkylsulfate, an alkylphosphate, a glycolate, a nitrate, a tetrafluoroborate, a hexafluorophosphate, a bistriflimide, a triflate, a tosylate, a carboxylate, a sulfate, a sulfonate, a perchlorate, a hexafluoridoantimonate, a hexafluoroarsinate, and any combination thereof.

Element A9: Wherein the PIL has the general formula:

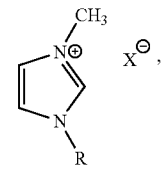

wherein X is an anion and R is a polymerizable functional group.

Element A10: Wherein the polymerizable functional group is selected from the group consisting of a monofunctional group, a multifunctional group, and any combination thereof.

Element A11: Wherein the polymerizable functional group is selected from the group consisting of a vinyl group, a vinyl aryl group, a styryl group, an imino group, an acrylate group, a methacrylate group, an acrylamide group, a methacrylamide group, a styrene group, an acryl amide group, a methacryl amide group, a maleate group, a fumarate group, an iconate group, an allyl group, an allyl amino group, a methallyl group, a crotyl group, a propargyl group, a lipoyl group, a dihydrolipoyl group, and any combination thereof.

Element A12: Wherein the PIL is selected from the group consisting of 1-allyl-3-methylimidazolium chloride, 1-allyl-3-methylimidazolium bis(trifluoromethylsulfonyl)amide, diallyldimethylammonium-bis(trifluoromethanesulfonyl) imide, and any combination thereof.

Element A13: Wherein the stabilization composition further comprises a polymerization initiator.

Element A14: Wherein the stabilization composition further comprises a polymerization initiator that is a thermal initiator selected from the group consisting of an azo initiator (e.g., azoisobutyronitrile, 4,4'-azobis(4-cyanovaleric acid), 1,1'-azobis(cyclohexanecarbonitrile), 2,2'-azobis(2-methylpropionamidine) dihydrochloride, 2,2'-azobis(2-methylpropionitrile), 2,2'-azobis(2-methylpropionitrile), an inorganic peroxide initiator (e.g. ammonium persulfate, hydroxymethanesulfinic acid, potassium persulfate, sodium persulfate), an organic peroxide initiator (e.g., tert-butyl hydroperoxide, tert-butyl peroxide, benzoyl peroxide), and any combination thereof.

Element A15: Wherein the stabilization composition further comprises a polymerization initiator that is a photoinitiator selected from the group consisting of an acetophenone photoinitiator, a benzoin photoinitiator, a benzyl photoinitiator, a benzophenone photoinitiator, a cationic photoinitiator, a thioxanthone photoinitiator, an anthraquinone-2-sulfonic acid sodium salt, a 2-tert-butylanthraquinone, a camphorquinone, a diphenyl(2,4,6-trimethylbenzoyl)phosphine oxide, a 9,10-phenanthrenequinone, a phenylbis(2,4,6-trimethylbenzoyl)phosphine oxide, and any combination thereof.

Element A16: Further comprising a tubular extending into the wellbore and a pump fluidly coupled to the tubular, wherein the stabilization composition is introduced into the wellbore through the tubular.

By way of non-limiting example, exemplary combinations applicable to A include: A with A4 and A16; A with A1, A2, and A5; A with A13, A14, and A15; A with A6, A8, and A9; A with A10 and A15; A with A3, A5, A6, and A11; A with A7 and A12.

Embodiment B: A method comprising: providing proppant particulates coated with a stabilization composition, thereby forming coated proppant particulates, wherein the stabilization composition comprises a polymerizable ionic liquid ("PIL") comprising a cationic group, an anionic group, and a polymerizable functional group; introducing the coated proppant particulates into wellbore in a subterranean formation; and polymerizing the PIL in the wellbore.

Embodiment B may have one or more of the following additional elements in any combination:

Element B1: Wherein the stabilization composition is included in a base fluid.

Element B2: Wherein the cationic group is an organic cationic group.

Element B3: Wherein the cationic group has a molecular mass in the range of about 20 g/mol to about 500 g/mol.

Element B4: Wherein the cationic group is selected from the group consisting of ammonium, phosphonium, pyridinium, imidazolium, a pyrrolidinium, a cholinium, a pyrazolium, and any combination thereof.

Element B5: Wherein the anionic group is selected from the group consisting of an organic anionic group, an inorganic cationic group, and any combination thereof.

Element B6: Wherein the anionic group has a molecular mass in the range of about 30 g/mol to about 500 g/mol.

Element B7: Wherein the anionic group is selected from the group consisting of a halide, a formate, an alkylsulfate, an alkylphosphate, a glycolate, a nitrate, a tetrafluoroborate, a hexafluorophosphate, a bistriflimide, a triflate, a tosylate, a carboxylate, a sulfate, a sulfonate, a perchlorate, a hexafluoridoantimonate, a hexafluoroarsinate, and any combination thereof.

Element B8: Wherein the PIL has the general formula:

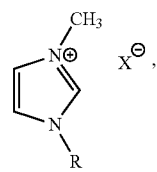

wherein X is an anion and R is a polymerizable functional group.

Element B9: Wherein the polymerizable functional group is selected from the group consisting of a monofunctional group, a multifunctional group, and any combination thereof.

Element B10: Wherein the polymerizable functional group is selected from the group consisting of a vinyl group, a vinyl aryl group, a styryl group, an imino group, an acrylate group, a methacrylate group, an acrylamide group, a methacrylamide group, a styrene group, an acryl amide group, a methacryl amide group, a maleate group, a fumarate group, an iconate group, an allyl group, an allyl amino group, a methallyl group, a crotyl group, a propargyl group, a lipoyl group, a dihydrolipoyl group, and any combination thereof.

Element B11: Wherein the PIL is selected from the group consisting of 1-allyl-3-methylimidazolium chloride, 1-allyl-3-methylimidazolium bis(trifluoromethylsulfonyl)amide, diallyldimethylammonium-bis(trifluoromethanesulfonyl) imide, and any combination thereof.

Element B12: Wherein the stabilization composition further comprises a polymerization initiator.

Element B13: Wherein the stabilization composition further comprises a polymerization initiator that is a thermal initiator selected from the group consisting of an azo initiator (e.g., azoisobutyronitrile, 4,4'-azobis(4-cyanovaleric acid), 1,1'-azobis(cyclohexanecarbonitrile), 2,2'-azobis(2-methylpropionamidine) dihydrochloride, 2,2'-azobis(2-methylpropionitrile), 2,2'-azobis(2-methylpropionitrile), an inorganic peroxide initiator (e.g. ammonium persulfate, hydroxymethanesulfinic acid, potassium persulfate, sodium persulfate), an organic peroxide initiator (e.g., tert-butyl hydroperoxide, tert-butyl peroxide, benzoyl peroxide), and any combination thereof.

Element B14: Wherein the stabilization composition further comprises a polymerization initiator that is a photoinitiator selected from the group consisting of an acetophenone photoinitiator, a benzoin photoinitiator, a benzyl photoinitiator, a benzophenone photoinitiator, a cationic photoinitiator, a thioxanthone photoinitiator, an anthraquinone-2-sulfonic acid sodium salt, a 2-tert-butylanthraquinone, a camphorquinone, a diphenyl(2,4,6-trimethylbenzoyl)phosphine oxide, a 9,10-phenanthrenequinone, a phenylbis(2,4,6-trimethylbenzoyl)phosphine oxide, and any combination thereof.

Element B15: Further comprising a tubular extending into the wellbore and a pump fluidly coupled to the tubular, wherein the coated proppant particulates are introduced into the wellbore through the tubular.

By way of non-limiting example, exemplary combinations applicable to B include: B with B1 and B15; B with B12, B13, and B14; B with B8 and B10; B with B2, B3, and B9; B with B6, B7, and B8; B4 and B5; B with B9, B11, and B15.

Embodiment C: A stabilization composition comprising: a polymerizable ionic liquid ("PIL") comprising a cationic group, an anionic group, and a polymerizable functional group, wherein the cationic group has a molecular mass in the range of about 20 g/mol to about 500 g/mol and the anionic group has a molecular mass in the range of about 30 g/mol to about 500 g/mol.

Embodiment C may have one or more of the following additional elements in any combination:

Element C1: Wherein the stabilization composition is included in a base fluid.

Element C2: Wherein the cationic group is an organic cationic group.

Element C3: Wherein the cationic group has a molecular mass in the range of about 20 g/mol to about 500 g/mol.

Element C4: Wherein the cationic group is selected from the group consisting of ammonium, phosphonium, pyridinium, imidazolium, a pyrrolidinium, a cholinium, a pyrazolium, and any combination thereof.

Element C5: Wherein the anionic group is selected from the group consisting of an organic anionic group, an inorganic cationic group, and any combination thereof.

Element C6: Wherein the anionic group has a molecular mass in the range of about 30 g/mol to about 500 g/mol.

Element C7: Wherein the anionic group is selected from the group consisting of a halide, a formate, an alkylsulfate, an alkylphosphate, a glycolate, a nitrate, a tetrafluoroborate, a hexafluorophosphate, a bistriflimide, a triflate, a tosylate, a carboxylate, a sulfate, a sulfonate, a perchlorate, a hexafluoridoantimonate, a hexafluoroarsinate, and any combination thereof.

Element C8: Wherein the PIL has the general formula:

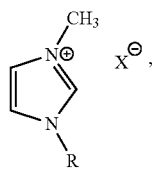

wherein X is an anion and R is a polymerizable functional group.

Element C9: Wherein the polymerizable functional group is selected from the group consisting of a monofunctional group, a multifunctional group, and any combination thereof.

Element C10: Wherein the polymerizable functional group is selected from the group consisting of a vinyl group, a vinyl aryl group, a styryl group, an imino group, an acrylate group, a methacrylate group, an acrylamide group, a methacrylamide group, a styrene group, an acryl amide group, a methacryl amide group, a maleate group, a fumarate group, an iconate group, an allyl group, an allyl amino group, a methallyl group, a crotyl group, a propargyl group, a lipoyl group, a dihydrolipoyl group, and any combination thereof.

Element C11: Wherein the PIL is selected from the group consisting of 1-allyl-3-methylimidazolium chloride, 1-allyl-3-methylimidazolium bis(trifluoromethylsulfonyl)amide, diallyldimethylammonium-bis(trifluoromethanesulfonyl) imide, and any combination thereof.

Element C12: Wherein the stabilization composition further comprises a polymerization initiator.

Element C13: Wherein the stabilization composition further comprises a polymerization initiator that is a thermal initiator selected from the group consisting of an azo initiator (e.g., azoisobutyronitrile, 4,4'-azobis(4-cyanovaleric acid), 1,1'-azobis(cyclohexanecarbonitrile), 2,2'-azobis(2-methylpropionamidine) dihydrochloride, 2,2'-azobis(2-methylpropionitrile), 2,2'-azobis(2-methylpropionitrile), an inorganic peroxide initiator (e.g. ammonium persulfate, hydroxymethanesulfinic acid, potassium persulfate, sodium persulfate), an organic peroxide initiator (e.g., tert-butyl hydroperoxide, tert-butyl peroxide, benzoyl peroxide), and any combination thereof.

Element C14: Wherein the stabilization composition further comprises a polymerization initiator that is a photoinitiator selected from the group consisting of an acetophenone photoinitiator, a benzoin photoinitiator, a benzyl photoinitiator, a benzophenone photoinitiator, a cationic photoinitiator, a thioxanthone photoinitiator, an anthraquinone-2-sulfonic acid sodium salt, a 2-tert-butylanthraquinone, a camphorquinone, a diphenyl(2,4,6-trimethylbenzoyl)phosphine oxide, a 9,10-phenanthrenequinone, a phenylbis(2,4,6-trimethylbenzoyl)phosphine oxide, and any combination thereof.

By way of non-limiting example, exemplary combinations applicable to C include: C with C1 and C2; C with C2, C4, and C7; C with C11, C12, and C13; C with C3 and C14; C with C12, C13, and C14; C with C5, C6, C8, and C10; C with C1 and C9.

"Exemplary" is used exclusively herein to mean "serving as an example, instance, or illustration." Any embodiment described herein as exemplary is not to be construed as preferred or advantageous over other embodiments.

To facilitate a better understanding of the embodiments of the present disclosure, the following example of representative embodiments are given. In no way should the following example be read to limit, or to define, the scope of the disclosure.

EXAMPLE

In this example, coated proppant particulates with the stabilization composition disclosed herein was prepared and tested for its consolidation properties. The PIL for use in the stabilization composition was 1-allyl-3-methylimidazolium bis(trifluoromethylsulfonyl)amide, having a molecular mass of 403.32 g/mol. In a 100 milliliter ("mL") round bottom flask with a reflux condenser, (1) 0.2 g (0.5 millimoles) of the 1-allyl-3-methylimidazolium bis(trifluoromethylsulfonyl)amide PIL, (2) 50 g of 20/40 UNIFRAC® sand (available from PropZone™ in New Canaan, Conn.), (3) 25 mL of an aqueous-miscible base fluid, tetrahydrofuran, and (4) 4 milligrams of a thermal polymerization initiator, AIBN, were combined. The contents of the flask was heated to reflux at 65° C. (149° F.) for 1 hour and thereafter allowed to cool to room temperature. The contents of the flask was visually observed for consolidation properties. The sand clumped together in the center of the flask, indicating that the PIL of the stabilization composition coated the sand and formed a 3D network that trapped the sand, allowing for efficient sand control.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   introducing a stabilization composition into a wellbore in a portion of a subterranean formation,
   wherein the stabilization composition comprises a polymerizable ionic liquid ("PIL") comprising a cationic group, an anionic group, and a polymerizable functional group, wherein the stabilization composition further comprises a polymerization initiator that polymerizes the PIL;
   coating a face of the portion of the subterranean formation with the stabilization composition; and
   polymerizing the PIL in the wellbore.

2. The method of claim 1, wherein the stabilization composition is included in a base fluid.

3. The method of claim 1, wherein the face of the portion of the subterranean formation is a fracture face.

4. The method of claim 1, wherein the cationic group is an organic cationic group.

5. The method of claim 1, wherein the cationic group has a molecular mass in the range of about 20 g/mol to about 500 g/mol.

6. The method of claim 1, wherein the cationic group is selected from the group consisting of ammonium, phosphonium, pyridinium, imidazolium, a pyrrolidinium, a cholinium, a pyrazolium, and any combination thereof.

7. The method of claim 1, wherein the anionic group is selected from the group consisting of an organic anionic group, an inorganic cationic group, and any combination thereof.

8. The method of claim 1, wherein the anionic group has a molecular mass in the range of about 30 g/mol to about 500 g/mol.

9. The method of claim 1, wherein the anionic group is selected from the group consisting of a halide, a formate, an alkylsulfate, an alkylphosphate, a glycolate, a nitrate, a tetrafluoroborate, a hexafluorophosphate, a bistriflimide, a triflate, a tosylate, a carboxylate, a sulfate, a sulfonate, a perchlorate, a hexafluoridoantimonate, a hexafluoroarsinate, and any combination thereof.

10. The method of claim 1, wherein the PIL has the general formula:

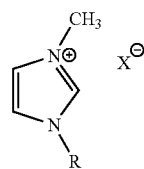

wherein X is an anion and R is the polymerizable functional group.

11. The method of claim 1, wherein the polymerizable functional group is selected from the group consisting of a monofunctional group, a multifunctional group, and any combination thereof.

12. The method of claim 1, wherein the polymerizable functional group is selected from the group consisting of a vinyl group, a vinyl aryl group, a styryl group, an imino group, an acrylate group, a methacrylate group, an acrylamide group, a methacrylamide group, a styrene group, an acryl amide group, a methacryl amide group, a maleate group, a fumarate group, an iconate group, an allyl group, an allyl amino group, a methallyl group, a crotyl group, a propargyl group, a lipoyl group, a dihydrolipoyl group, and any combination thereof.

13. The method of claim 1, wherein the PIL is selected from the group consisting of 1-allyl-3-methylimidazolium chloride, 1-allyl-3-methylimidazolium bis(trifluoromethylsulfonyl)amide, diallyldimethylammonium-bis(trifluoromethanesulfonyl)imide, and any combination thereof.

14. The method of claim 1, wherein the polymerization initiator is a thermal initiator selected from the group consisting of an azo initiator, 2,2'-azobis(2-methylpropionamidine) dihydrochloride, 2,2'-azobis(2-methylpropionitrile), an inorganic peroxide initiator, an organic peroxide initiator, and any combination thereof.

15. The method of claim 1, wherein the polymerization initiator is a photoinitiator selected from the group consisting of an acetophenone photoinitiator, a benzoin photoinitiator, a benzyl photoinitiator, a benzophenone photoinitiator, a cationic photoinitiator, a thioxanthone photoinitiator, an anthraquinone-2-sulfonic acid sodium salt, a 2-tert-butylanthraquinone, a camphorquinone, a diphenyl(2,4,6-trimethylbenzoyl)phosphine oxide, a 9,10-phenanthrenequinone, a phenylbis(2,4,6-trimethylbenzoyl)phosphine oxide, and any combination thereof.

16. The method of claim 1, further comprising a tubular extending into the wellbore and a pump fluidly coupled to the tubular, wherein the stabilization composition is introduced into the wellbore through the tubular.

17. A method comprising:
    providing proppant particulates coated with a stabilization composition, thereby forming coated proppant particulates,
    wherein the stabilization composition comprises a polymerizable ionic liquid ("PIL") comprising a cationic group, an anionic group, and a polymerizable functional group, wherein the stabilization composition further comprises a polymerization initiator that polymerizes the PIL;
    introducing the coated proppant particulates into wellbore in a subterranean formation; and
    polymerizing the PIL in the wellbore.

18. The method of claim 17, further comprising a tubular extending into the wellbore and a pump fluidly coupled to the tubular, wherein the coated proppant particulates are introduced into the wellbore through the tubular.

19. A stabilization composition comprising:
a polymerizable ionic liquid ("PIL") comprising a cationic group, an anionic group, and a polymerizable functional group wherein the stabilization composition further comprises a polymerization initiator that polymerizes the PIL and is present in an amount of from about 0.1% to about 10% by weight of the PIL in the stabilization composition,
wherein the cationic group has a molecular mass in the range of about 20 g/mol to about 500 g/mol and the anionic group has a molecular mass in the range of about 30 g/mol to about 500 g/mol.

* * * * *